United States Patent [19]

Anderson et al.

[11] 3,980,611

[45] Sept. 14, 1976

[54] FILLED THERMOPLASTIC FILMS

[75] Inventors: Jerrel Charles Anderson; Richard Jay England, both of Circleville, Ohio; Gunter Friedrich Meier, Wilmington, Del.

[73] Assignee: E. I. Du Pont de Nemours and Company, Wilmington, Del.

[22] Filed: Jan. 18, 1973

[21] Appl. No.: 324,876

Related U.S. Application Data

[63] Continuation-in-part of Ser. No. 151,899, June 10, 1971, abandoned, which is a continuation-in-part of Ser. No. 53,018, July 7, 1970, abandoned.

[52] U.S. Cl................ 260/40 R; 260/37 N; 260/42.46; 260/42.54
[51] Int. Cl.² ................ C08K 3/22; C08K 3/32; C08K 3/36
[58] Field of Search .......... 260/40 R, 41 R, 41.5 R, 260/45.7 P, 42.46; 106/306

[56] References Cited
UNITED STATES PATENTS

| | | | |
|---|---|---|---|
| 3,271,343 | 9/1966 | Lowes | 260/45.7 P |
| 3,374,199 | 3/1968 | Ross | 260/41 R |
| 3,382,206 | 5/1968 | Karickhoff | 260/40 R |
| 3,419,460 | 12/1968 | Ure | 260/40 R |
| 3,445,259 | 5/1969 | Brooks | 106/306 |
| 3,520,846 | 7/1970 | England | 260/40 R |
| 3,590,528 | 7/1971 | Shepherd | 260/45.7 P |
| 3,607,818 | 9/1971 | Trubisky | 260/33.2 R |
| 3,821,156 | 6/1974 | Farrar | 260/40 R |

*Primary Examiner*—Paul R. Michl

[57] ABSTRACT

A thermoplastic film having dispersed therein an inert material consisting essentially of:

1. coarse particles having a size greater than 2.5 microns in a concentration determined by the formula $$C_1 = K_{coarse/T}0.6$$

where $C_1$ is the concentration of coarse particles in parts per million, $K_{coarse}$ is at least equal to an emperically determined value of $K_{coarse}$ at the minimum concentration of coarse particles which permits escape of air during film wind-up, and T is film thickness in mils, 2. medium particles having a size of 1 to 2.5 microns in a concentration determined by the formula $$C_2 = K_{medium/T}0.6$$

where $C_2$ is the concentration of medium particles in parts per million, $K_{medium}$ is no greater than an emperically determined value of $K_{medium}$ at the concentration of medium particles in a film having a clarity of 50%, and T is film thickness in mils, and 3. fine particles having a size less than 1 micron in a concentration determined by the formula:

$$C_3 = K_{fine/T}0.6$$

where $C_3$ is the concentration of fine particles in parts per million, $K_{fine}$ is at least equal to an emperically determined value of $K_{fine}$ at an effective concentration of fine particles to give a film static coefficient of friction less than about 1, and T is film thickness in mils, with the provisos that:

a. the total $K_{total} = K_{coarse} + K_{medium} + K_{fine}$ is equal to or less than about 2,510, and b. the ratio of $K_{medium}/K_{total}$ is equal to or less than about 0.3

Also a process for preparing the film. The filler material provides excellent winding characteristics while maintaining commercially acceptable clear films.

15 Claims, No Drawings

FILLED THERMOPLASTIC FILMS

CROSS REFERENCE TO RELATED APPLICATIONS

This application is a continuation-in-part of United States patent application Ser. No. 151,899, filed June 10, 1971, now abandoned, which in turn is a continuation-in-part of United States patent application Ser. No. 53,018, filed July 7, 1970, now abandoned.

BACKGROUND OF THE INVENTION

In the preparation of thermoplastic films, inert particles have been incorporated into the film product to improve the winding characteristics of the finished films. However, the incorporation of particles large enough to produce asperities in the finished film product required for improved winding performance is often accompanied by areas between asperities in which the surface characteristics of the thermoplastic material are such that interfacial sticking occurs between surfaces of the finished film product. This prevents the formation of smooth, regular rolls of the film. The increase of the number of large particles to prevent iinterfacial sticking between film layers often results in a depreciation of the gloss and haze characteristics of the finished film product.

SUMARY OF THE INVENTION

The instant invention provides a provides a process for the preparation of thermoplastic films having improved winding characteristics which are free of interfacial sticking during winding operations while maintaining commercially acceptable optical clarity.

Specifically, the instant invention provides an improvement in a process for preparing thermoplastic film by extruding film-forming polymer in the molten state and dispersing inert material in the film-forming polymer prior to extrusion which improvement comprises dispersing therein an inert material comprised of coarse particles wherein the particle size is greater than 2.5 microns, medium-sized particles wherein the particles size is 1 to 2.5 microns and fine particles wherein the particle size is less than 1 micron and the concentration of coarse, medium, fine and total number of particles dispersed therein is consistent with the following formula:

$$C = K/T^{0.6}$$

where C is the concentration of the inert material in parts per million (ppm), T is the film thickness in mils, K is a constant, empirically determined and primarily dependent on the type of thermplastic and the type of inert filler used, $K_{total} = K_{coarse} + K_{medium} + K_{fine}$, $K_{total}$ is equal to other than a value of about 2,510 and the ratio of $K_{medium}/K_{total}$ is equal to or less than about 0.3.

DESCRIPTION OF THE PREFERRED EMBODIMENTS

Thermoplastic materials which can be used in the instant invention include polyesters such as polyethylene terephthalate, polyamides such as nylon 66 and nylon 6, polyolefins such as polypropylene and polyethylene, and vinyl polymers. Particularly preferred polymers include polyalkylene terephthalate polymers produced from the reaction product of terephthalic acid, or a dialkyl ester of terephthalic acid (especially dimethyl terephthalate) and glycols of the series $HO(CH_2)_nOH$ wherein n is an integer greater than 1 but not exceeding 10. Suitable glycols include ethylene glycol, trimethylene glycol, hexamethylene glycol, cyclohexane dimethanol and the like. Other functional compounds which can be reacted with terephthalic acid or with a dialkyl ester of terephthalic acid to produce linear polyester types, include p-xylene glycol, hydroquinone, and cyclic glycols. Other polymers which can be used include polyalkylene terephthalate-containing modifiers such as dibasic acids including among others, isophthalic acid, sebacic acid, adipic acid, sulfonated derivatives and the like.

Inert additives which can be used in the instant invention include those materials which are insoluble in and do not react with the particular thermoplastic material in which they are to be incorporated. In addition, the additives must leave the film with commercially acceptable optical clarity.

Representative materials which can be incorporated include silica, kaolin, china clay, aluminosilicates, diatomaceous earth, and calcium phosphates such as calcium pyrophosphate, dibasic calcium phosphate, tribasic calcium phosphate, and calcium carbonate. Of these, tribasic calcium phosphate having the formula $3Ca_3(PO_4)_2 \cdot CA(OH)_2$ and calcium hydrogen phosphate having the chemical formula $CaHPO_4$ are particularly preferred, since the refractive indices of these materials are especially compatible with the preferred polyester materials of the instant invention and these phosphates can be readily ground to the preferred particle size distribution with minimal mixing and blending of materials.

A particularly preferred tricalcium phosphate is that commercially available from the Monsanto Company as "TCP" tricalcium phosphate. This material has the following maximum particle size distribution: 0% greater than 150 microns; 12% greater than 30 microns; 26% greater than 15 microns; 45.5% greater than 6 microns; 56% greater than 3 microns; 67.5% greater than 1.5 microns; 79% greater than 0.6 microns. This material, by suitable grinding techniques, can be reduced and blended to satisfy the particle size distribution requirements of the instant invention.

The films of the present invention must have commercially acceptable clarity along with commercially acceptable winding characteristics. Improved winding characteristics are obtained by adding inert particles; however, these inert particles tend to scatter light and, therefore, reduce the clarity of the film. There are acceptable tolerances in the properties of clarity and winding characteristics, however, which permit a range of acceptable inert particles resulting in a film that has both acceptable clarity and acceptable winding characteristics.

It has been found that coarse particle sizes, i.e., 2.5 microns up to 10 microns, are necessary to provide projections on the surface of the film which keep film wraps separated by providing air channels to permit air entrapped during windup to escape. Since coarse particles do scatter light, it is desirable to keep the requisite number of particles incorporated into the film at a minimum.

It has also been found that fine particles sizes, i.e., less than 1 micron, are necessary to keep the coefficient of friction of the film low to provide sufficient slip for the films to wrap easily by sliding over one another.

It is desirable to have a static coefficient of friction of less than 1 and preferably about 0.2 to 0.6. The static coefficient of friction is measured by the inclined method and equals the tangent of the minimum angle of an inclined plane where sliding commences. This is measured by a Slide Angle Tester, Model CS-152 of Custom Scientific Instruments, Inc., Whippany, New York, used according to the procedure described in TAPPI's Proposed Method Vol. 50, No. 1, January 1967.

Fines do not scatter light to any great extent; therefore, they do not significantly affect the optical properties of the film. However, for practical reasons, the number of fines used is determined only by the desired coefficient of friction one wishes to impart to the film.

The medium-sized particles, i.e., 1 to 2.5 microns, however, do create a problem. They do not materially scatter light and, therefore, adversely affect the optical properties of the film giving the film an appearance of being hazy. There is no significant positive reason for their presence except for the fact that it is very difficult to prepare inert fillers and not have these medium-sized particles present. Desirably, they should be eliminated, but, practically, they are present. Their presence, however, is kept to a practical quantitative minimum which is below that quantity which would cause objectionable haze or reduction in clarity. Film clarity down to a level of about 50% is tolerable; however, it is preferred that the level be at or above 70%. Film clarty is measured by ASTM D-1746-70.

The amount of filler material added, including the amount of coarse, medium, fines, and the gross total present, is inversely proportional to the thickness of the film. The thinner the film, the more filler material required. This is so because the thinner the film, the more limp the film. The more limp the film, the greater its tendency to stick together. Therefore, large numbers of coarse particles are needed to keep the film apart providing air channels, and a high number of fines are needed to reduce the coefficient of friction thereby aiding in the slip properties of the films.

This inverse ratio of film thickness to concentration of particles present in the film has been empirically determined and its follows the following formula:

$$C = K/T^{0.6}$$

where $C$ = concentration of filler in parts per million (ppm), $T$ = film thickness in mils, $K$ = constant, empirically determined.

This formula is applied in the following manner. Films are prepared wherein the thickness is constant and the amount of filler material, i.e., coarse, medium, fine, and gross total of particles present, is varied until the optimum balance of winding characteristics and optical properties is achieved. Once the acceptable concentration is found, the constant K can be determined and this constant is then used in the formula to determine the acceptable concentration for other thicknesses of the same type of film.

A value for K is determined for each particle size of filler, i.e., coarse, medium and fine, along wih the gross total and $K_{total} = K_{coarse} + K_{medium} + K_{fine}$. It has been determined that the value of $K_{total}$ should not exceed about 2,510 and the ratio of $K_{medium}/K_{total}$ should be equal to or less than about 0.3. These are practical values for the most effective results.

Illustrative use of formula:

(Calculations have been rounded off to the nearest whole number.)

It was experimentally determined that a concentration (C) of 800 ppm of medium-sized tricalcium phosphate particles, i.e., 1 to 2.5 microns, was acceptable in a 0.1 mil thick polyethylene terephthalate film. Therefore, C = 800 and T = 0.1; solving the formula for K, the following constant is determined:

$$K = CT^{0.6}$$

$$K = (800)(0.1)^{0.6}$$

$$K = 200$$

medium

Now to use this constant (K) and determine the acceptable level of the same type of medium-sized particles in a 1 mil thick film made of the same thermoplastic, wherein K = 200 and T = 0.1 and C is to be determined:

$$C = K/T^{0.6}$$

$$C = 200/(1)^{0.6}$$

$$C \leq 200 \text{ ppm}$$

This indicates that the maximum amount of medium-sized particles in a 1 mil thick film should not exceed 200 ppm.

The present invention has been found to be particularly effective on film having a thickness of about 0.1 to 3.0 mils. The following information illustrates the establishment of a family of K values for the same polyethylene terephthalate film used above wherein a value of $K_{medium}$ has been established.

Since the concentration of particles useful in a film is inversely proportional to the film thickness, all maximum values are determined on 0.1 mil thick film and all minimum values on 3.0 mil thick film.

It was experimentally determined that, for the coarse particles size, 50 ppm was the minimum concentration acceptable for a 3 mil thick film; therefore:

$$K = CT^{0.6}$$

$$K = 50(3)^{0.6}$$

$$K \geq 97$$

coarse

A similar experiment was run to determine the constant (K) for fines and it was experimentally determined that 100 ppm was the minimum concentration acceptable in a 3 mil thick film. Therefore:

$$K = CT^{0.6}$$

$$K = 100(3)^{0.6}$$

$$K \geq 194$$

fines

It was also determined that, for a gross total of particles in a 0.1 mil thick film, the concentration should not exceed 10,000 ppm. Therefore:

$$K = CT^{0.6}$$

$$K = 10,000(0.1)^{0.6}$$

$$K \leq 2,510$$

In summary:

$K_{coarse}$ = 97 to 500

$K_{medium}$ = 200 or less $K_{fines}$ = 194 to 2,000

$K_{gross\ total}$ = 2,510 or less

Using these constants for 0.5 mil film, the following results are obtained:

$C_{fines} = 194/(0.5)^{0.6} = 294$ ppm min.

$C_{fines} = 2,000/(0.5)^{0.6} = 3,030$ ppm max.

$C_{medium} = 200/(0.5)^{0.6} = 303$ ppm max.

$C_{coarse} = 97/(0.5)^{0.6} = 147$ ppm min.

$C_{coarse} = 500/(0.5)^{0.6} = 758$ ppm max.

The specified particle sizes refer to that dimension most critical to the surface characteristics of the film product into which the inert material is incorporated, namely, the maximum dimension of the particle. For larger particles, the maximum dimension can be readily determined by microscopic examination. In a procedure found particularly satisfactory for the preferred calcium phosphate addivities of the present invention, a Leitz "Ortholux" microscope equipped with a 100X oil immersion objective is used to obtain the photomicrographs from which particle size counts were taken. A 2000X magnification is used. In preparing the sample, the sandmilled slurries are diluted to 2% by weight of additive with ethylene glycol. A drop of this slurry is then placed on a microscope slide and then covered with a No. 1½ cover slip. The slide is placed on the stage and viewed using the oil immersion technique in order to gain the highest magnifications possible. Photomicrographs of these slurries are studied for the number and maximum dimension of the inert additive particles.

A measurement of the number and maximum size of particles having a size below 1 micron by the microscopic technique outlined above is incomplete since, using this technique, no particles below 0.5 micron are adequately enough resolved for counting purposes. Therefore, it is helpful to use additional measuring techniques in conjunction with microscopic measurement. A supplement technique found particularly well suited to the preferred calcium phosphate additives involves a Sedigraph 5000 particles size analyzer manufactured by the Micromeritics Instrument Corporation of Norcross, Georgia. This instrument measures the sedimentation rates of particles suspended in a liquid, and gives data on the entire mass of the additive in the sample used.

In preparing samples of the preferred calcium phosphate particles for testing in the Sedigraph, the additive is conveniently combined with a liquid so as to comprise 1% by volume of the slurry. An attractive diluent for testng purposes has been found to be 95% ethanol, since ths material has a low viscosity which permits expedient sedimentation rates ad this material does not agglomerate the additve. The density and viscosity of the liquid medium and the density of the particulate material mus be known to calculate a rate constant on the Sedigraph. The rate constant is calculated from the following equation:

$$\text{Rate Constant} = \frac{54.22\ (\rho - \rho o)}{(50/Dm)^2 \eta}$$

where $\eta$ = viscosity of the liquid in centipoise, $\tau$ = the density of the additive, and $\rho o$ = the density of the liquid medium, and Dm is the maximum particle diameter which is normally set at $50\mu$.

The data obtained from the Sedigraph is a particle size distribution curve plotted as cumulative mass percent finer versus Equivalent Spherical Diameter (ESD). The ESD of a particle is a diameter assigned to an irregularly shaped particle having a certain sedimentation velocity which is equivalent to that of a sphere composed of the material having a matching sedimentation velocity. Accordingly, the EDS of an irregularly shaped particle is an artifical diameter determined by its settling velocity.

While the data obtained from the Sedigraph analysis is complete for the entire mass of the additive, the ESD particle size from the Sedigraph is not a desirable particle measurement for the purposes of the instant invention. As indicated above, the dimension most important to film surface properties is the maximum dimension of the additives. Accordingly, data obtained by sedigraphic analysis must be converted to maximum particle dimension. It has been found that the ratio between the highest particle dimension obtained by microscopic analysis and the highest ESD obtained by sedigraphic analysis on different quantities of the same sample of additive was approximately 3:1. Accordingly, the particles size distribution obtained from the Sedigraph is multiplied by a factor of 3 to convert from the Equivalent Spherical Diameter to the maximum particle size which is the critical measurement in the present invention.

The conversion of the data obtained as Equivalent Spherical Diameter is necessary because the particles of the preferred calcium phosphate materials have a platelet, rather than a spherical configuration. It will be readily appreciated that with other inert additives, the necessity for converting Sedigraph measurements decreases as the actual configuraton of the particles becomes more spherical.

In addition, when more spherical additive particles are used, the quantities required to produce satisfactory winding performance can, in general, be adjusted toward the lower end of the specified ranges, since spherical particles have been found to be more efficient in producing asperities in the film surface.

The required blend of partcle sizes can be obtained through various techniques available to those skilled in the art including grinding and blending of additives of the required particle size. Using the preferred calcium phosphates, it has been found convenient to prepare dispersions of commercially available phosphates and grind the dispersed phosphates in a sand mill. Dispersions having concentrations of primarily large and small particles can be obtained by repeating a grinding cycle one or more times to reduce the particle size of the additive in the slurry to the particle size desired.

The required quantities of inert material can be added to the film-forming material at any point prior to the extrusion of the polymer as a film. With the preferred polyester materials, it has been found particularly convenient to add the inert particles as a slurry after the ester interchange reaction in which the monomers are formed which polymerize to form the polyester, the inert additives being added together with the catalysts required for the polymerization.

The films prepared accordingly to the instant invention exhibit, in the finished film product, a mixture of surface asperities of greater and lesser magnitude which, in combination, result in exceptional winding performance in combination with a degree of interfacial slip which facilities the production of smooth, regular mill rolls.

The instant invention is further illustrated by the following specific example. All parts, percentages, and ratios are by weight unless otherwise specified.

EXAMPLE 1

A tricalcium phosphate commercially available from Monsanto Company as "TCP" tricalcium phosphate is admixed with ethylene glycol to form a slurry having a 35% solids content. A portion of the slurry is fed at a rate of 15 gallons per hour into a "Redhead" sandmill and milled twice using 24 pounds of 20-mesh sand. A seond portion of the slurry is milled four times. The resulting slurries are diluted to a 2% solids content with additional ethylene glycol and a 50/50 mixture of the 2% slurries is formed.

The mixed slurry is pumped into the monomer stream of a continuous process for the preparation of polyethylene terephthalate, after the ester interchange reaction, the combined slurry being added in quantities such that a total of 736 ppm of tricalcium phosphate is added. Of this quantity of tricalcium phosphate, 188 ppm have a particle size greater than 2.5 microns and 360 ppm have a particle size of less than 1.0 micron.

The K values and C values for 0.5 mil thick polyethylene terephthalate are already calculated above is: the range of concentrations restated s: >2.5 microns (147 –758 ppm), 1–2.5 microns (<303 ppm) and <1 micron (303–3,000). The actual particle distribution used falls within these ranges. The value of the ratio of $K_{medium}/K_{total}$ is determined as follows:

$$K = CT^{0.6}$$

$$\frac{K_{medium}}{K_{total}} = \frac{188(0.5)^{0.6}}{736(0.5)^{0.6}} = 0.28.$$

Polymerization catalysts are added to the reaction mixture and the resulting polymer is extruded onto a cooled quench surface and biaxially oriented. The resulting product has a total thickness of about 0.5 mil.

The resulting film product is evaluated for optical properties and it is found to be substantially free from haze and to exhibit excellent clarity and surface gloss. The film is evaluated for winding characteristics and found to produce smooth mill rolls at high winding speeds with no observable interfacial sticking, surface blemishing, or telescoping.

EXAMPLE 2

A biaxially oriented, polyethylene terephthalate film is prepared having incorporated therein about 2,150 ppm of an inert filler material. The inert material is comprised of about 150 ppm of "Linde 13X," commercially available from the Union Carbide Corporation, and 2,000 ppm of "Cabot L5," commercially available from the Cabot Corporation. "Linde 13X" is $Na_{86}[(AlO_2)_{86}(SiO_2)_{106}]\cdot xH_2O$ wherein 68 weight percent of the particles are greater than 2.5 microns, 26 weight percent of the particles are between 1 and 2.5 microns, and 6 weight percent of the particles are less than 1 micron in size. "Cabot L5" is silicon dioxide having a particle size that is less than 200 millimicrons.

The films are specifically prepared in the following manner.

Ethylene glycol slurries of "Linde 13X" alumina silicate molecular sieve and "Cabot L5" silicon dioxide are prepared at concentrations of 12.6% and 20.0% solids, respectively. The slurries are separately sand-milled and mixed in the required quantities with 300 milliliters of ethylene glycol, after which 320 grams of crushed dihydroxyethyl terephthalate monomer are added. The glycol is distilled away at atmospheric pressure. The molten monomer is then polymerized at 285°C. at a pressure of about 0.5 millimeters of mercury. The resulting polyethylene terephthalate is cooled, powdered and dried.

The dried polymer powder is melt pressed at 285°C. into films haviing a thickness of about 0.010 to 0.015 inch. The films are biaxially oriented by stretching at 95°C., 3.5X by 3.5X, and then heat-set under restraint at 210°C.

The films are evaluated for winding and optical characteristics and are found to exhibit exceptional winding performance and a satisfactorily high degree of lateral slip, permitting the formation of smooth rolls. In addition, the depreciation of the clarity and other optical properties in the films of the present invention due to the presence of the larger molecular sieve particles is minimal making the optical clarity commercially acceptable.

EXAMPLE 3

A film of polyethylene terephthalate having calcium phosphate dispersed therein is prepared in the following manner. Two different grinds of calcium phosphae are prepared by sandmilling calcium phosphate in glycol. The particle distribution as measured on Sedigraph curves is as follows:

|  | Number of Particles (ppm)/Particle Size | | | |
|---|---|---|---|---|
|  | Total | Less Than 1 Micron | 1–2.5 Microns | Greater Than 2.5 Mircons |
| Grind No. 1 | 726 | 427 | 194 | 142 |
| Grind No. 2 | 705 | 592 | 85 | 28 |
| Gross Totals | 1431 | 1019 | 279 | 170 |

The two different grinds of calcium phosphate are blended together on an equal-parts basis to form a 49 weight percent solids slurry of calcium phosphate in glycol. The glycol slurry in the amount of 300 grams is mixed with 300 grams of (bis-hydroxyethyl terephthalate) monomer containing a polymerization catalyst. The monomer is polymerized under a vacuum until the polymer has an intrinsic viscosity of about 0.55. The polymer is cooled to solidify it and it is then ground to a powder. A 10 mil thick film is formed by melt pressing the powdered polymer at 290°C., then the film is quenched. The quenched film is heated in a laboratory stretcher at 95°C. and is simultaneously stretched three times its original dimensions in each of two mutually perpendicular directions.

The resulting film has a thickness of about 1.57 mils, a coefficient of friction of about 0.46 and a film clarity above 80% making the film commercially acceptable as clear film suitable in packaging uses.

EXAMPLE 4

A film of polypropylene having calcium phosphate dispersed therein is prepared in the following manner. Two different grinds of calcium phosphate are prepared by sandmilling calcium phosphate in glycol. The particle distribution as measured on Sedigraph curves is as follows:

| | Number of Particles (ppm)/Particle Size | | | |
|---|---|---|---|---|
| | Total | Less Than 1 Micron | 1-2.5 Microns | Greater Than 2.5 Microns |
| Grind No. 1 | 725 | 406 | 184 | 135 |
| Grind No. 2 | 704 | 591 | 84 | 28 |
| Gross Totals | 1429 | 997 | 268 | 163 |

The two different grinds of calcium phosphate are blended together on an equal-parts basis to form a 49 weight percent solids slurry of calcium phosphate in glycol. The glycol slurry in the amount of 300 grams is mixed with 300 grams of propylene in a vacuum oven with the glycol being drawn off into the vacuum system. The polymer is cooled to solidify it and it is then ground to a powder. A 10 mil thick film is formed by melt pressing the powdered polymer. Thereafter, the film is heated and biaxially stretched until the film has a thickness of about 0.7 mil.

The resulting film has a coefficient of friction of about 0.39 and a film clarity above 80% making the film commercially acceptable as clear film suitable in packaging uses.

EXAMPLE 5

A film of polyethylene terephthalate having an inert filler dispersed therein is prepared in the same manner as that disclosed in Example 3 with the exception that inert filler is calcium carbonate and silica instead of calcium phosphate. The calcium carbonate and silica used is prepared by separately sandmilling the calcium carbonate and silica in glycol. The calcium carbonate and silica grinds are mixed and the particle distribution as measured on Sedigraph curves is as follows:

| | Number of Particles (ppm)/Particle Size | | | |
|---|---|---|---|---|
| | Total | Less Than 1 Micron | 1-2.5 Microns | Greater Than 2.5 Microns |
| Grind No. 1 (CaCO$_3$) | 270 | 19 | 81 | 170 |
| Grind No. 2 (Silica) | 579 | 579 | 0 | 0 |
| Gross Totals | 849 | 598 | 81 | 170 |

The resulting film has a thickness of about 1.2 mils, a coefficient of friction of about 0.40 and a film clarity above 80% making the film commercially acceptable as clear film suitable for use in packaging.

We claim:

1. A thermoplastic film having dispersed therein an inert material selected from the group consisting of silica, kaolin, china clay, an aluminosilicate, diatomaceous earth, calcium phosphate, and mixtures thereof, the inert material consisting essentially of 1. coarse particles having a size of 2.5 to about 10 microns in a concentration determined by the formula $$C_1 = K_{coarse}/T^{0.6}$$

where $C_1$ is the concentration of coarse particles in parts per million, $K_{coarse}$ is at least equal to an empirically determined value of $K_{coarse}$ at the minimum concentration of coarse particles which permits escape of air during the film windup and T is film thickness in mils, 2. medium particles having a size of 1 to 2.5 microns in a concentration determined by the formula $$C_2 = K_{medium}/T^{0.6}$$

where $C_2$ is the concentration of medium particles in parts per million, $K_{medium}$ is no greater than an empirically determined value of $K_{medium}$ at the concentration of medium particles in a film having a clarity of 70%, and T is film thickness in mils, and 3. fine particles having a size less than 1 micron in a concentration determined by the formula:

$$C_3 = K_{fine}/T^{0.6}$$

where $C_3$ is the concentration of fine particles in parts per million, $K_{fine}$ is at least equal to an empirically determined value of $K_{fine}$ at an effective concentration of fine particles to give a film static coefficient of friction less than about 1, and T is film thickness in mils, with the provisos that:

a. the total $K_{total} = K_{coarse} + K_{medium} + K_{fine}$ is equal to or less than about 2,510, and b. the ratio of $K_{medium}/K_{total}$ is equal to or less than about 0.3.

2. The thermoplastic film of claim 1 wherein the thermoplastic film is polyethylene terephthalate.

3. The thermoplastic film of claim 2 having a thickness of 0.1 to 3.0 mils.

4. The thermoplastic film of claim 3 having a static coefficient of friction of about 0.2 to 0.6.

5. The thermoplastic film of claim 1 wherein the inert material is calcium phosphate.

6. The thermoplastic film of claim 5 wherein the inert material is tribasic calcium phosphate of the formula $3Ca_3(PO_4)_2 \cdot Ca(OH)_2$.

7. The thermoplastic film of claim 1 wherein the thermoplastic film is a polyolefin.

8. The thermoplastic film of claim 5 wherein the inert material is calcium hydrogen phosphate.

9. The thermoplastc film of claim 5 wherein the thermoplastic material is polyethylene terephthalate.

10. In a process for preparing thermoplastic film comprising dispersing an inert material in a filmforming thermoplastic polymer and subsequently extruding the thermoplastic polymer in a molten state; the improvement wherein the inert material is at least one of silica, kaolin, china clay, an aluminosilicate, diatomaceous earth, or a calcium phosphate and consists essentially of 1. coarse particles having a size of 2.5 to about 10 microns in a concentration determined by the formula $$C_1 = K_{coarse}/T^{0.6}$$

wherein $C_1$ is the concentration of coarse particles in parts per million, $K_{coarse}$ is at least eqaul to an empirically determined value of $K_{coarse}$ at the minimum concentration of coarse particles which permits escape of air during film windup, and T is film thickness in mils, 2. medium particles having a size of 1 to 2.5 microns in a concentration determined by the formula $$C_2 = K_{medium}/T^{0.6}$$

where $C_2$ is the concentration of medium particles in parts per million, $K_{medium}$ is no greater than an empiricaly determined value of $K_{medium}$ at the concentration of medium particles in a film having a clarity of 70%, and T is film thickness in mils, and 3. fine particles havng a size less than 1 micron in a concentration determined by the formula $$C_3 = K_{fine}/T^{0.6}$$

where $C_3$ is the concentration of fine particles in parts per million, $K_{fine}$ is at least equal to an empirically determined value of $K_{fine}$ at an effective concentration of fine particles to give a film static coefficient of friction less than about 1, and T is film thickness in mils, with the provisos that:
   a. the total $K_{total} = K_{coarse} + K_{medium} + K_{fine}$ is equal to or less than about 2,510, and
   b. the ratio of $K_{medium}/K_{total}$ is equal to or less than about 0.3.

11. The process of claim 10 wherein the thermoplastic polymer is polyethylene terephthalate.

12. The process of claim 11 wherein the film has a thickness of 0.1 to 3.0 mils.

13. The process of claim 11 wherein the inert material is calcium phosphate.

14. The process of claim 13 wherein the inert material is tribasic calcium phosphate of the formula $3Ca_3(PO_4)_2 \cdot Ca(OH)_2$.

15. The process of claim 10 wheren the thermoplastic polymer is polyolefin.

* * * * *